No. 870,143. PATENTED NOV. 5, 1907.
V. J. WAHLSTROM.
CHUCK.
APPLICATION FILED FEB. 18, 1907.

Attest
F. H. Vick
F. V. Teale

Inventor
Verner J. Wahlstrom,
By Sydney Prescott, Atty.

UNITED STATES PATENT OFFICE.

VERNER J. WAHLSTROM, OF NEW YORK, N. Y.

CHUCK.

No. 870,143.  Specification of Letters Patent.  Patented Nov. 5, 1907.

Application filed February 18, 1907. Serial No. 358,106.

*To all whom it may concern:*

Be it known that I, VERNER J. WAHLSTROM, a citizen of the United States, residing at New York, in the county of Kings and State of New York, have invented a new and useful Chuck, of which the following is a specification.

This invention relates to an improvement in chucks.

In certain types of chucks heretofore employed a plurality of radially movable jaws has been used, each jaw carrying a roller arranged to be rolled up an inclined face on the jaw by contact with a tool shank to effect the clamping of the same. In these devices the roller was provided with studs engaging suitable slots in the jaws and for certain reasons this construction has been found to be objectionable.

It is one of the objects of this invention to provide a chuck having jaws movable radially toward and away from the axis of the chuck, the biting action being effected by rollers operating on inclined faces on the jaws so that only a very limited movement of the roller is necessary to hold the tool shank after it has been brought into contact with the same, the roller being of a simpler and cheaper construction than heretofore.

With this and other objects in view, the invention consists in certain constructions and combinations which will be hereinafter fully described and then specifically pointed out in the claims hereunto appended.

Figure 1:
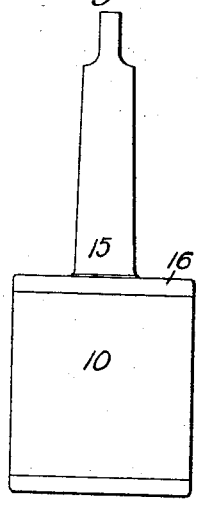
Figure 2:
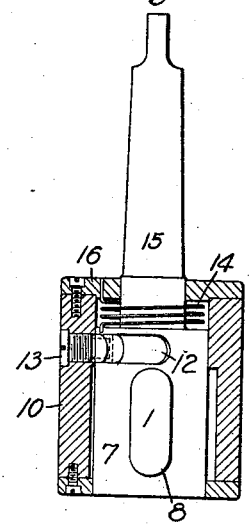
Figure 3:
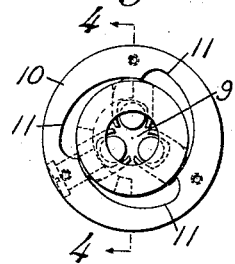
Figure 4:
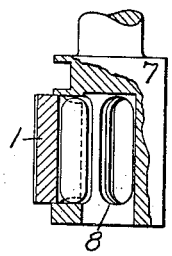
Figure 5:
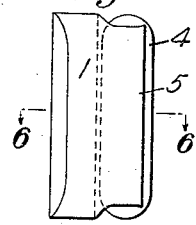
Figure 6:
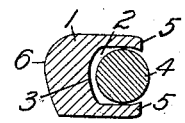

In the drawings which form a part of this specification and in which like characters of reference indicate the same parts, Figure 1 is an elevation of a structure embodying the invention; Fig. 2 is an elevation, partly in section, of the structure shown in Fig. 1; Fig. 3 is an end view with certain parts removed; Fig. 4 is an elevation, partly in section, of the chuck body and one of the radially movable jaws; Fig. 5 is an enlarged detailed view of one of the jaws; and Fig. 6 is a sectional view on the line 6—6 in Fig. 5.

In carrying the invention into effect, a radially movable jaw provided with a longitudinal channel is employed and this jaw may vary widely in construction. As shown, a jaw 1 is employed which has cut therein a longitudinal channel 2, the base of which has an inclined face 3. A roller 4 is employed and is loosely mounted within the channel 2 before referred to and arranged to be rolled up the inclined face 3 by contact with the tool shank. Means are provided for retaining the roller 4 within the channel 2 and these means may vary widely in construction. As shown, the roller 4 is of a diameter greater than the depth of the channel 2 and the outer edges of the channel wall 5 are bent toward each other to retain the roller within the channel. The jaw 1 is provided with a rounded rear edge 6, the purpose of which will be hereinafter explained. Where more than one size of tool shank is to be used in the chuck, a plurality of jaws and rollers is used and it is to be understood that when more than one jaw is used each is a duplicate of the other. In the device illustrated, three such jaws are employed and are spaced 120 degrees apart. The operation of this part of the structure is as follows: The jaws are moved toward the axis of the chuck by any suitable means and after the rollers 4 come in contact with the shank of the tool, the radial movement of the jaws ceases and the rollers 4 are forced up the inclined face 3 of the jaw by the resistance of the tool shank to the rotating movement of the chuck so that the shank is clamped rigidly between the rollers, the clamping action increasing as the resistance increases. Owing to the fact that the roller is seated against the inclined face before it comes into operation, a very slight rolling movement is all that is necessary to bite the tool shank hard and the radial movement of the jaw has nothing whatever to do with the biting action, the only function of this movement being to bring the rollers into operative position with respect to different sized tool shanks. When the tool is to be released, the jaws are moved in the opposite direction, instantly releasing the pressure of the rollers on the tool shank and releasing the same.

When a plurality of jaws is used, they are mounted in a cylindrical chuck body 7 having radial slots 8 cut through its walls and opening into a central aperture 9, within which the tool shank is inserted. The jaws 1 are mounted in the radial slots 8 and are arranged to be moved toward and away from the axis of the aperture 9 with their operative faces in parallelism.

Means are provided for positively moving the jaws toward the axis of the chuck for the purpose of bringing the rollers 4 into contact with the tool shank and this means may vary widely in construction. In the best constructions and as shown, a cylindrical sleeve 10 is employed, this sleeve fitting loosely over the chuck body 7 and arranged to operate the jaws. In the device selected to illustrate the invention the sleeve 10 is provided with a series of internal cam faces 11, arranged for direct contact with the rounded rear edges 6 of the jaws before referred to.

It will be readily understood that if a relative movement in one direction between the chuck body 7 and the sleeve 10 is produced, the jaws 1 will be positively moved toward the axis of the aperture 9 and that if a movement in the opposite direction is produced, the jaws will be freed.

In order to hold the sleeve 10 in its proper position, the chuck body 7 is provided with a circumferential slot 12 and the sleeve 10 is provided with a stud 13 which engages the slot 12.

In the device illustrated, a rotatory movement is given the sleeve on the chuck body to positively move the jaws toward the axis of the chuck and this is accomplished by means of a spring 14 surrounding a shank 15 extended from the chuck body 7 before referred to, one end of the spring being fast in the chuck body and the other end being fast in a plate 16 carried by the sleeve 10.

Changes and variations may be made in the structure by which the invention is carried into effect. The invention therefore is not to be limited to the precise details of the structure shown and described.

What is claimed is:—

1. In a chuck, the combination with a radially movable jaw provided with a longitudinal channel open at both ends and the base of which has an inclined face, of a roller loosely mounted in the channel and arranged to be rolled up the inclined face by contact with a tool shank, and means for retaining the roller within the channel, substantially as described.

2. In a chuck, the combination with a radially movable jaw provided with a longitudinal channel open at both ends and the base of which has an inclined face, of a roller the diameter of which is greater than the depth of the channel and which is loosely mounted in the channel and arranged to be rolled up the inclined face by contact with a tool shank, and means for retaining the roller within the channel, substantially as described.

3. In a chuck, the combination with a radially movable jaw provided with a longitudinal channel the base of which has an inclined face, of a roller loosely mounted in the channel and arranged to be rolled up the inclined face by contact with a tool shank, the outer edges of the channel walls being bent toward each other to retain the roller within the channel, substantially as described.

In testimony whereof, I have signed my name to this specification in the presence of two subscribing witnesses.

VERNER J. WAHLSTROM.

Witnesses:
J. D. H. BERGEN,
HARRY C. GUION.